United States Patent [19]

Majors

[11] 4,252,357

[45] Feb. 24, 1981

[54] FIREPLACE LOG GRAPPLE

[76] Inventor: Vence V. Majors, Rte. 2, Hardy, Ark. 72542

[21] Appl. No.: 36,666

[22] Filed: May 7, 1979

Related U.S. Application Data

[62] Division of Ser. No. 898,088, Apr. 20, 1978, Pat. No. 4,186,839.

[51] Int. Cl.[3] .......................... A47J 49/00; B66C 1/42

[52] U.S. Cl. .......................... 294/11; 294/16; 294/103 R

[58] Field of Search .......................... 294/9-11, 294/14, 16, 22, 34, 67 BB, 92, 99 S, 103 R; 248/355, 410; 403/105, 373

[56] References Cited

U.S. PATENT DOCUMENTS

| | | | |
|---|---|---|---|
| 481,986 | 9/1892 | Waldron | 294/34 |
| 836,303 | 11/1906 | Christensen | 294/92 X |
| 2,051,969 | 8/1936 | Shastock | 294/92 X |
| 2,140,165 | 12/1938 | Plitt | 294/34 |
| 2,735,713 | 2/1956 | Blakeley | 294/67 BB |
| 3,065,982 | 11/1962 | Dodd | 248/410 X |

FOREIGN PATENT DOCUMENTS

| | | | |
|---|---|---|---|
| 86246 | 5/1936 | Sweden | 248/410 |
| 8883 | of 1896 | United Kingdom | 294/34 |

*Primary Examiner*—Johnny D. Cherry
*Attorney, Agent, or Firm*—B. P. Fishburne, Jr.

[57] ABSTRACT

A wheeled platform provides a storage space for logs below an elevated track supported on standards rising from the platform. A trolley device movable along the track supports an easily adjustable log gripping and release device which is utilized to place logs in a fireplace or in the fire box of a stove or furnace. The user of the crane need not place the logs by hand, thus avoiding the possibility of being burned.

1 Claim, 8 Drawing Figures

FIG.1
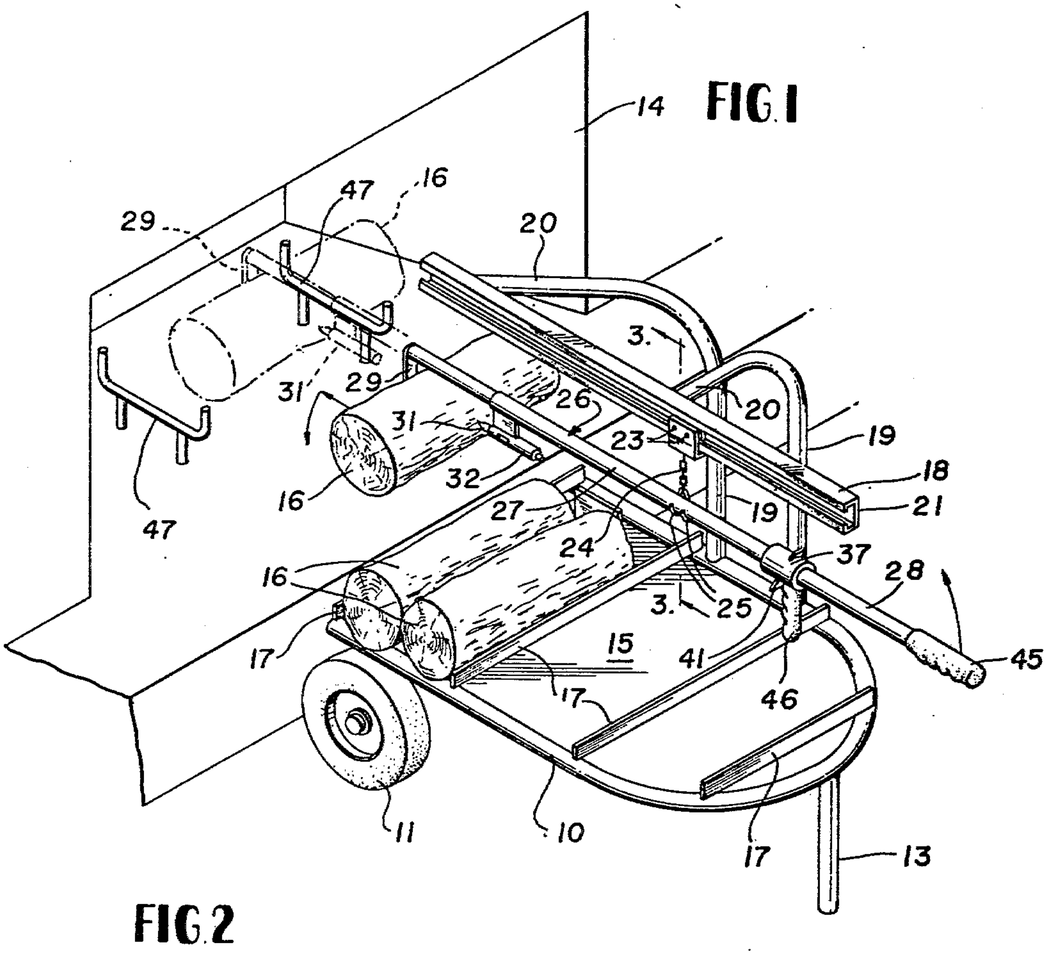
FIG.2
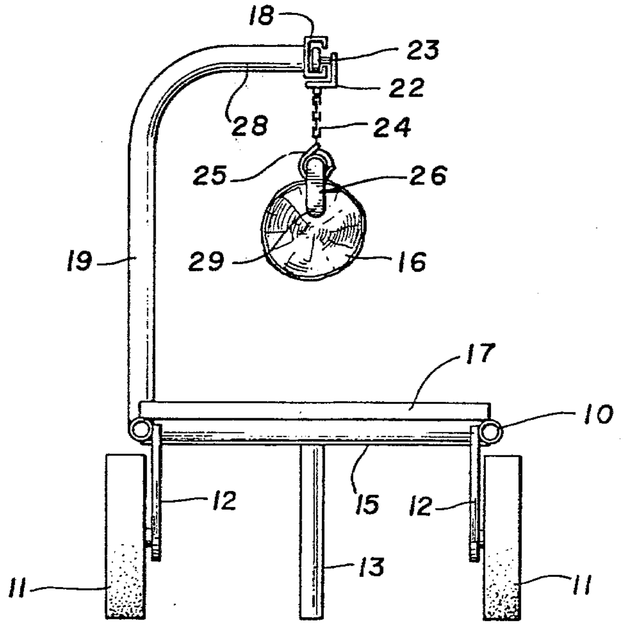
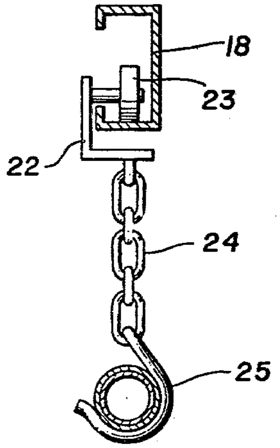
FIG.3

FIREPLACE LOG GRAPPLE

This is a division of application Ser. No. 898,088, filed Apr. 20, 1978, now U.S. Pat. No. 4,186,839.

BACKGROUND OF THE INVENTION

The dramatic increase in the use of wood for fuel in home fireplaces and wood stoves resulting from the high cost of conventional energy has given rise to a need for a simplified, convenient, inexpensive and safe means for handling and placing logs in fireplaces, wood stoves and furnaces. The lifting and handling of sometimes heavy logs is difficult and when such logs are dropped or placed by hand in a fireplace or wood stove burning of the person handling the log can occur and/or flying sparks produced by dropping the log too suddenly can cause serious fires.

The simple objective of this invention is to satisfy the above need in the art through provision of a very simple and comparatively low cost log crane or handling device which enables anyone to impale a comparatively heavy log, lift it, shift it to the proper position for placement in a fireplace or stove, lower the log onto andirons or the like, and release it without dropping it. The crane is simple and convenient to operate, is sturdy in construction, and provides a storage platform for additional logs. It is wheeled for easy movement adjacent to a fireplace or stove and has an elevated guide track for a trolley device from which a log gripping and positioning grapple is suspended. The grapple has easily operated relatively movable components equipped with handles and a friction locking means which can be released by trigger-like action. A pair of relatively movable impaling jaws on the grapple allow logs to be engaged and lifted crosswise or endwise.

While the prior art contains many teachings pertaining to cranes, grapples and lifting and transporting devices for a variety of purposes, no known prior art structure is suited to the needs of the present invention. To comply with the duty to disclose pertinent prior art under 37 C.F.R. 1.56, the following United States patents are made of record herein: U.S. Pat. Nos. 410,108; 428,301; 1,021,290; 2,653,725; 3,059,785; 3,191,786.

Other features and advantages of the invention will become apparent during the course of the following description.

BRIEF DESCRIPTION OF THE DRAWINGS

FIG. 1 is a perspective view of a crane for handling logs embodying the invention.

FIG. 2 is an end elevational view of the crane showing a log being held endwise by the crane grapple.

FIG. 3 is an enlarged transverse vertical section taken on line 3—3 of FIG. 1.

DETAILED DESCRIPTION

Figures 4, 5, 6, 7, 8:
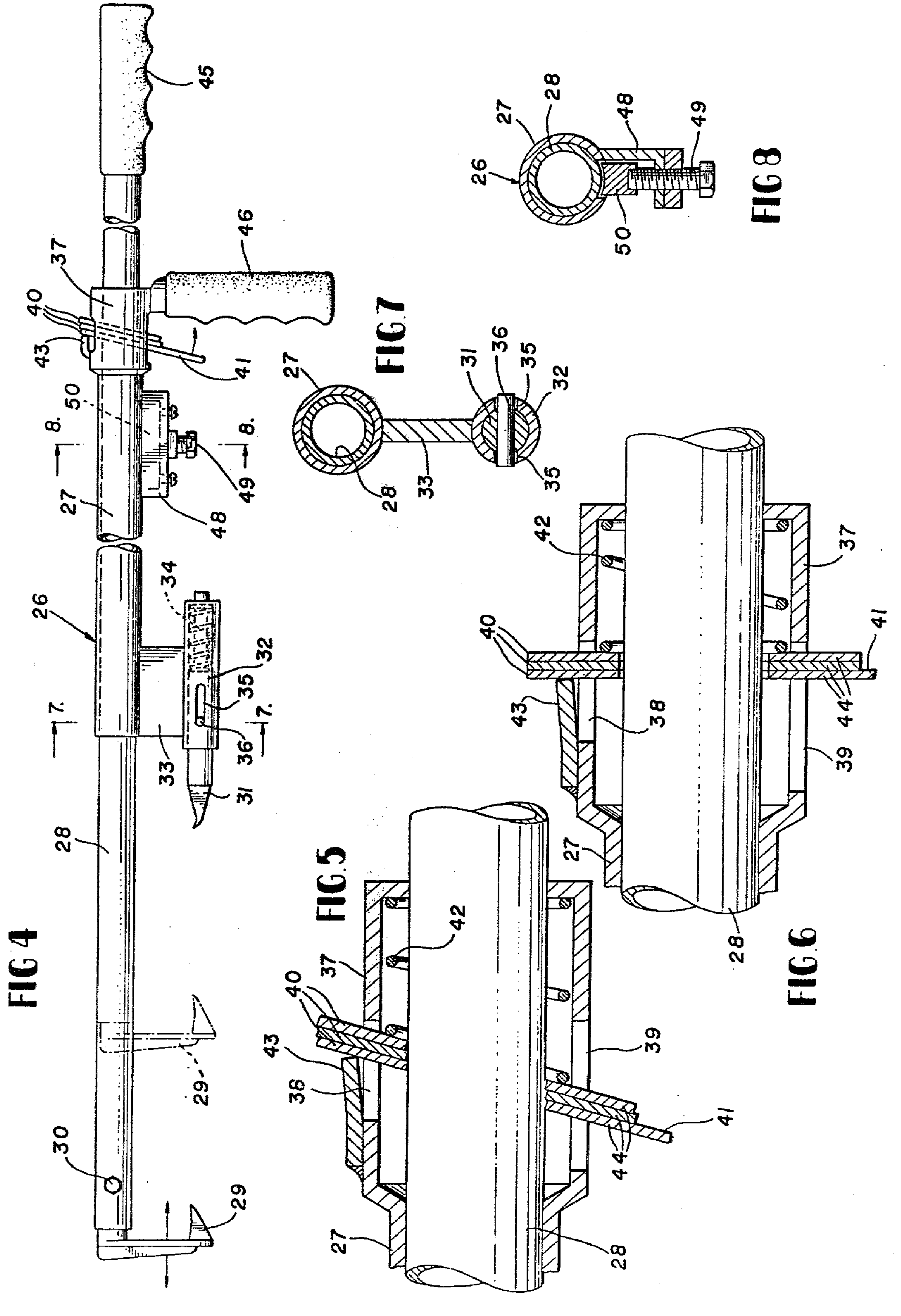
FIG. 4 is a side elevation of the crane grapple, partly broken away.
FIG. 5 is an enlarged fragmentary vertical longitudinal section taken through the grapple lock and release mechanism and showing the same in the active or locking position.
FIG. 6 is a similar view showing the mechanism in the inactive or release position to allow manual adjustment of the grapple.
FIG. 7 is an enlarged transverse vertical section taken on line 7—7 of FIG. 4.
FIG. 8 is a similar section taken on line 8—8 of FIG. 4.

Referring to the drawings in detail, wherein like numerals designate like parts, the log crane comprises a horizontal low elevation horse shoe frame 10 formed of sturdy tubing and being equipped near its forward end with a pair of wheels 11 supported by brackets 12 depending from and rigidly secured to the sides of the frame 10. The frame 10 has a single depending rigid leg 13 at its rear end for stabilizing the crane once it has been positioned in a use position adjacent to a fireplace 14, FIG. 1, wood stove or furnace. A flat horizontal plate element 15 welded or otherwise secured to the bottom of frame 10 provides a support platform for a resonable number of logs 16 which can be stored on the crane, as illustrated. Transverse horizontal divider bars 17 welded to the top of frame 10 prevent the logs 16 from rolling.

The log crane further comprises an elevated straight horizontal longitudinal guide track 18 of modified C-cross section disposed over the frame 10 at the transverse center thereof, FIG. 2. This track is rigidly supported by a pair of spaced standards 19 which rise from one side of the frame 10 and include top transverse arms 20 which are secured to the vertical web 21 of the guide track 18. Mounted for free movement fore and aft on the track 18 is a trolley 22 having a pair of rollers 23 which engage and follow the track 18 in the operation of the crane.

A short length of chain 24 depends from the trolley 22 and carries suspension hooks 25 at its lower end for the adjustable cradling and support of a crane grapple assembly 26 forming an important component of the invention. The grapple 26 consists of an outer sleeve 27 and an inner tube member 28 telescopically engaged slidably in the sleeve 27 and extending entirely therethrough.

The forward end of tube member 28 carries a rigid depending grapple jaw or hook 29 secured thereto at 30, and the forward end of sleeve 27 carries an opposing spring-urged jaw or pin 31 held in a sleeve 32 secured fixedly to a web 33 depending from the bottom of sleeve 27. The jaw or pin 31 is engaged and biased forwardly toward the jaw 29 by a compression spring 34 in the sleeve 32 and longitudinal slots 35 in opposite sides of the sleeve 32 serve to guide and prevent rotation of the spring-urged jaw 31 through engagement with a cross pin 36 of the jaw 31.

The grapple sleeve 27 has a rear enlargement 37 having top and bottom slots 38 and 39 receiving canted locking plates or washers 40, one of which washers has a lower trigger extension 41 to be operated by the user of the grapple to release the tube member 28 for sliding movement fore and aft through the sleeve 27. The locking washers 40 are preferably formed of hardened heat-treated metal enabling them to frictionally grip and bite into the tube 28 when inclined or canted, FIG. 5, to lock the grapple in a selected adjusted position. An expansion spring 42 contained within the enlargement 37 biases the washers 40 toward their active locking positions in FIG. 5 and a rigid stop element 43 on the top of enlargement 37 limits forward movement of the washers in the slot 38, as shown, while the lower extensions 44 of the washers 40 have freedom of movement in the slot 39. The general mode of operation of canted washer locking devices is well known in a variety of applications, and need not be further described.

The rear end of grapple tube 28 is equipped with a horizontal hand grip 45 and the bottom of the enlargement 37 carries a depending vertical right angular hand grip 46. The trigger extension 41 lies just ahead of hand grip 46 for convenient grasping with the index finger. When the extension 41 is pulled rearwardly, the washers 40, FIG. 6, move against the spring 42 to positions at right angles to the tube 28 and release the tube for free sliding movement fore and aft within the sleeve 27 by merely pushing or pulling on the hand grip 45. Thus, the simple grapple 26 is conveniently manipulated and adjusted by the two hands of the user with the index finger of one hand operating the trigger extension 41 to release the friction locking means consisting of the washers 40.

The entire grapple 26 is bodily suspended and supported by the hooks 25 from the overhead track 18 and may be manually shifted forwardly and rearwardly to any necessary position along the track to allow proper placing of a log 16 on andirons 47 in the fireplace 14 or into the fire box of a stove or furnace. With the wheeled crane properly positioned adjacent to a fireplace or stove, a log 16 may be engaged and picked up by the jaws 29 and 31 crosswise, as shown in FIG. 1, or longitudinally, as shown in FIG. 2, depending upon requirements. With the log securely gripped by the grapple jaws, it may be moved with the grapple 26 freely along the track 18 to any necessary position and during this operation the grapple can be freely tilted upwardly or downwardly or swung to either side of the track by virtue of its suspension on the flexible chain 24. When the log 16 is properly placed in the fireplace or stove, the trigger extension 41 is pulled rearwardly to release the tube 28 and the user pushes the tube forwardly and away from the jaw 31 to disengage the log.

Preferably, an auxiliary positive lock or brake, FIG. 8, for the tube 28 is provided, although this feature may be omitted, if desired. Its purpose is to prevent free sliding of the components 27 and 28 when the crane is not in use. The brake comprises an L-bracket 48 fixed to the bottom of sleeve 27 slightly forwardly of enlargement 37 and carrying a bottom set screw 49 which operates a friction brake shoe 50 adapted to engage the bottom of tube 28 at proper times to securely lock the tube against movement within the sleeve 27.

The invention is characterized by simplicity, economy and convenience of use. It is rugged and durable, versatile in its usage, and requires virtually no maintenance. Its advantages should now be apparent to those skilled in the art.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A grapple for lifting and transporting logs and the like comprising coaxial telescoping members adapted for relative movement on a linear path, manually releasable normally engaged locking means interconnecting said members whereby they may be locked in any selected relative position on said linear path, a fixed rigid jaw on one of said members including an arm portion extending transversely of the members beyond corresponding sides thereof and a point carried by the outer end of the arm portion and having an axis substantially perpendicular to the arm portion and parallel to the axis of the telescoping members, and a yielding jaw on the other telescoping member connected therewith by a rigid arm member attached to the other telescoping member and being in opposing parallel relationship to said arm portion in substantially a common radial plane with the latter, the yielding jaw including a slotted sleeve fixed to the outer end of the rigid arm member and having a bore substantially coaxial with said point, a pin element slidable within the sleeve axially of the sleeve toward and away from said point and including a point arranged in opposition to the first-named point of the fixed rigid jaw, a spring contained within the sleeve constantly urging the pin element toward the fixed rigid jaw, and a projecting part on the pin element engaging in the slot of the sleeve and preventing rotation of the pin element within the sleeve and limiting axial movement of the pin element in the sleeve to the length of the slot along the axis of the sleeve.

* * * * *